United States Patent

[11] 3,616,841

| [72] | Inventor | Duane D. Walz |
| | | Rancho Cordova, Calif. |
| [21] | Appl. No. | 679,204 |
| [22] | Filed | Oct. 30, 1967 |
| [45] | Patented | Nov. 2, 1971 |
| [73] | Assignee | Energy Research and Generation, Inc. |
| | | Oakland, Calif. |

[54] METHOD OF MAKING AN INORGANIC RETICULATED FOAM STRUCTURE
10 Claims, No Drawings

[52] U.S. Cl. ................................................. 164/34,
164/62, 164/65, 164/71, 164/246, 264/44, 264/59, 264/332

[51] Int. Cl. ................................................. B22d 25/00, C04b 35/60

[50] Field of Search .......................................... 264/29, 44, 59, DIG. 44; 75/222; 106/122; 164/34, 246

[56] References Cited

UNITED STATES PATENTS

| 3,408,180 | 10/1968 | Winkler ........................ | 75/222 |
| 3,090,094 | 5/1963 | Schwartzwalder et al. ... | 75/222 |
| 3,097,930 | 7/1963 | Holland ........................ | 75/222 |
| 3,111,396 | 11/1963 | Ball ............................... | 75/222 |
| 3,339,620 | 9/1967 | Krzyzanowski et al. ...... | 164/246 |
| 3,362,463 | 1/1968 | Manginelli..................... | 264/44 |
| 3,498,365 | 3/1970 | Wittmoser..................... | 164/34 |
| 2,830,343 | 4/1958 | Shroyer........................ | 264/DIG. 44 |
| 3,176,054 | 3/1965 | Einstein et al. ............... | 264/59 |
| 3,362,818 | 1/1968 | Schwarzkopf et al......... | 264/59 |
| 3,387,940 | 6/1968 | McHenry et al. ............. | 264/29 |
| 3,470,117 | 9/1969 | Pearce........................... | 264/29 |
| 3,470,276 | 9/1969 | Ohno............................. | 264/59 |

FOREIGN PATENTS

| 627,229 | 7/1963 | Belgium ........................ | 164/34 |
| 938,861 | 10/1963 | Great Britain................. | 264/59 |

*Primary Examiner*—Donald J. Arnold
*Assistant Examiner*—John H. Miller
*Attorney*—Townsend & Townsend

ABSTRACT: The production of foam material, e.g., a reticulated ceramic, metal or cermet material, is carried out by using commercially available conventional foam, such as reticulated polyurethane, having the desired pattern for the end product. This foam serves as a pattern for the mold and is embedded in mold material of plaster of paris or the like, which sets to form a solid structure in and around the plastic foam. This investment structure is then heated to volatilize and expel the plastic foam, leaving voids in the mold corresponding to the original configuration of the foam. Molten metal or other substance is then cast through the voids or openings in the mold and permitted to cool and set. The mold structure is then washed away, leaving a reticulated structure of integrally formed ligaments of metal, ceramic, cermet or other desired substance.

METHOD OF MAKING AN INORGANIC RETICULATED FOAM STRUCTURE

BACKGROUND OF THE INVENTION

Form retaining reticulated structures of metal or the like have heretofore been produced by a number of different processes or techniques, and have a wide variety of utilitarian purposes. By way of example only, such structures may be used as light weight structural members, solid propellant reinforcement and burning rate modifiers, battery plates, fluid phase separators, electrochemical anodes and cathodes, heat shields, heat exchanger cores, fluid filters, sound or shock absorbers, anodic protectors, flame guards, liquid reservoirs, microwave reflectors, as well as in numerous other applications.

Foam material produced by methods taught in the prior art possess a number of shortcomings and features of disadvantage. By way of example, one such method which has hereto fore been commercially exploited is disclosed in U.S. Pat. No. 3,053,967. Such patent produces a sintered foamed metal structure by mixing plastic beads with powdered metal, adding a binder, and the mixture is then compressed and bonded together. The metallic powder is sintered by heating the mixture, with the plastic beads oxidizing, and eventually escaping as carbon dioxide gas and water vapor. Using this process, it is not possible to use aluminum or other metals which possess a strong affinity for oxygen, since the exposed surfaces will become oxidized and the sintering process cannot take place. Also, there is a practical limit to a finished thickness of less than 2 inches, and the finished structure discloses discontinuities in the metal ligaments. Also, the cell sizes must be relatively small, e.g., in the neighborhood of about 30 cells per inch, large cell sizes not being producible with such a system. In adddition, the structure of the metal ligaments is weakened due to the presence of hydrogen and carbon dioxide gases which are absorbed in the metal.

SUMMARY OF THE INVENTION

In accordance with the teachings of the present invention, the foam material may be produced in substantially any size or shape, and possess a wide range of cell sizes, such as from three to 80 cells to the inch. The material may likewise be selected from a wide range of substances, including metals, alloys, ceramics and cermets. Also, since there is not sintering operation, materials being highly oxidizable, such as aluminum, may be used, as well as materials which do not surface oxidize, such as copper or nickel. As an important feature of this invention, steps are taken to insure free and complete communication between all of the voids in the mold, so that when the molten metal or other substance is poured into such voids, the metal ligaments, upon setting, will form a continuous, integral structure, without discontinuities, and define a plurality of voids or openings to provide the reticulated structure. Since the molten substance can be heated to its molten state externally of the mold, the problems otherwise encountered in attempting to heat a large volume of material to its melting temperature is overcome. It will also be understood that in using the present process, the cells usually are not oriented, and as a result the strength and density of the material is substantially isotropic.

DESCRIPTION OF THE PREFERRED EMBODIMENT

In carrying out the present process, there is first provided a mass of conventional reticulated plastic foam, such as polyurethane, which is used as the pattern for the finished foam metal. Such reticulated plastic foam is commercially available as an open pore skeletal structure having a wide range of pore or void sizes. By way of example, Scott industrial foam, designated by the trademark Polyfoam, is appropriate for this purpose. Such plastic foam is produced in a variety of overall widths and thicknesses, and the foam may be easily cut or formed into the desired shape of the foam structure which is to be produced. One primary property required of the plastic foam is that it will volatilize at some practical workable temperature, as will be later more fully explained, and accordingly, where the term "plastic foam" is used herein, it should be construed to include other foam materials such as foam wax or the like.

In some instances, and under certain conditions, it is possible to place the plastic foam directly into a plaster of paris or other suitable mold material which sets to form a solid structure in an about the foam in the nature of an investment casting. However, it is usually preferred to perform additional steps by means of which the density of the finished reticulated product may be selectively varied, and the danger of the investment blowing up due to creation of steam during the heating process is eliminated.

Accordingly, as the next and preferred step in the process, the desired shape of plastic foam is wetted by immersion in molten wax, such as dental was, investment wax or conventional household paraffin, such was coming into intimate contact with the ligaments of the plastic foam pattern. The pattern is then removed from the molten wax bath, and upon exposure to air at normal room temperature, the wax will harden as a thin layer or coating on the pattern ligaments. If the pattern is rapidly removed from the bath, a large amount of wax will remain in the pattern, and to eliminate excess wax and to especially eliminate "windows," i.e., a thin wax membrane extending between ligaments, the pattern, prior to setting of the wax is agitated, squeezed or shaken, and heated, such as by hot gas gets, thus getting rid of the wax excess.

The pattern is then placed in an oven and heated to a temperature somewhat above the melting point of wax, or about 150° F., and the melted wax is drained from the pattern. Periodic shaking of the pattern during this heating step facilitates this draining. Visual inspection will readily indicate whether any windows remain. If no such windows or any physically discernible globs of wax remain in the pattern, the latter is removed from the oven and allowed to cool. As a result of this operation, notwithstanding the heating, a thin coating of wax will fully wet all surfaces of the pattern in the nature of a thin layer whose thickness can be varied, depending on the viscosity of the wax and its temperature when applied to the pattern. It is believed that this layer remains due to surface tension created by wetting of the surface between the wax and ligaments.

Next, a wax layer is provided completely across one end or side of the pattern. This layer or runner may be formed on the pattern by melting wax as previously explained in a dish or pan, the height of the molten wax in such dish or pan being that of the desired wax runner on the pattern. The pattern is then set in the dish and the wax permitted to cool and solidify. The dish or pan is preferably formed of foil or the like so as to permit stripping thereof from the wax, and the excess wax is then trimmed or cut away to conform to the shape of the pattern.

A pouring sprue and gate is inserted into the wax runner, preferably immediately prior to the setting of the wax. The pouring sprue is preferably formed of wax, styrofoam or other material which will volatilize and cease to exist at highly elevated temperatures.

The pattern is now ready for investment with plaster of paris, Gray's general purpose investment, or other settable, heat resistant material which can be subsequently removed by being dissolved or washed away by water or other liquids, or removed by mechanical forces. A casting flask or sleeve, preferably having sidewalls and an open bottom is placed on a vibrating table, with the pattern disposed therein and spaced from the sidewalls, the bottom and the closed top, with the sprue a uppermost. The investment is poured into the sleeve completely around the pattern, and just below the upper open end of the sprue. The bottom of the sleeve is sealed to the table the latter is vibrated, and a vacuum is preferably pulled in the sleeve by connecting the top thereof to a vacuum source. The vacuum assists in removing air from all interstices of the pattern and insure the investment material flowing therein. The vacuum and vibration is continued for about 1 minute, and then stopped. After the plaster or other investment material has set, the sleeve is removed from the table and the lower layer of plaster scraped away, exposing the pores or voids on the surface of the pattern remote from the sprue.

Without removing the investment from the sleeve or flask, the investment is permitted to set for about one-half to 1 hour, and this assembly is then placed in an oven or furnace at a temperature of about 250° F. for approximately 2 hours, depending on size, for the purpose of driving off the water. If the water is driven off too rapidly, steam is generated and pressure can build up within the investment, causing it to explode. In this connection, it will be recalled that the ligaments are coated with wax, and since the wax melts at a relatively low temperature, passageways are promptly established for the escape of steam. Layer passageways permit higher rates of steam venting and therefore higher temperatures may be used for shorter time periods in order to drive off the water.

After this water elimination step, the temperature is increased to a value sufficient to volitalize the plastic foam. Typically, this value lies in the range of 1,000° to 1,500° F. This high temperature is continued for about 2 hours, or until the plastic foam and wax coating has been completely volitalized and driven off, leaving the pure investment. The investment may then be further purified by flushing the investment with a cleansing gas such as oxygen, and then filling the investment with an inert gas, such as argon.

The flask and investment may then be removed from the furnace and placed on a chill plate and molten metal or other substance is poured through the sprue into the investment. Water is sprayed on the outer walls of the flask and on the chill plate to help in cooling, and as the molten metal hits the chill plate, it first solidifies along the bottom, and the water cooling tends to likewise first solidify the metal from the sides inwardly. Cooling can be further controlled by applying heat in order to keep the sprue molten until the remainder of the casting has solidified. Such heating methods include electric resistance heating and torches. Other cooling techniques, such as an air spray, could likewise be used. To assist in the flow of the molten substance through the investment, a pressure differential may be created by applying air or other gas pressure to the upper surface thereof. Conversely, the chill plate may be provided with apertures and connected to a vacuum source. Where a gas is used, an inert gas possesses certain advantages. It will also be understood, however, that mechanical means, such as vibrations may be provided to assist in proper flow through the investment. The use of an inert gas or vacuum increases the physical properties of the material by eliminating adverse chemical reactions and minimizing gas absorption of the material respectively.

When all of the voids of the investment are filled, the substance will cool and solidify in an integral form retaining continuous mass of ligaments having a fine grain system which is gas free and of low porosity. Upon such solidification, the casting is cooled, such as by quenching the same in water. The investment is then removed from the newly formed foam structure which possesses the same configuration as the original pattern. The removal or freeing of the structure from the mold may be performed in any conventional manner, i.e., washing, dissolving, air pressure, mechanical separation, or any combination thereof.

It should be understood that the foregoing description is merely illustrative of the process employed, since it will be apparent that in most of the separate steps of the process, other and usually conventional steps may be substituted for those described herein.

The system leads itself to an extremely wide range of metals such as aluminum, lithium, copper, zinc, lead, nickel, iron, silver, sulfur, magnesium, uranium, etc., metal alloys, ceramics, and cermets, and in all instances, the finished foam material will be characterized in having ligaments which are continuous, gas free, or low porosity and of integral construction.

Since the cell size and shape of the pattern is multidirectional uniform, so will be the cell size and shape of the produced foam material. In this latter connection, however, it is important to note that the plastic foam which constitutes the pattern can constitute, for example, two separate pieces of such foam having different cell sizes. By way of illustration only, one piece might be cut in the form of a cylinder and the other piece in the form of an annulus surrounding the core. The finished foam structure produced with such a pattern will still maintain its integral and continuous nature, but will possess different size cells in the central portion than in the radially outer portions. This method may be extended to include multiple pieces of plastic foam individuall y oriented. This process then produces a material having an inhomogeneous structure. The anistropy of the structure can be further increase d by deforming the structure after cooling so as to achieve highly dimensionalized and anistropic properties A further modification may occur by first coating the plastic foam with an epoxy plastic having a melting point higher than that of the plastic foam. In this instance, the coated foam is first heated to a temperature sufficient to volitalize the plastic foam and turn the same to carbon, i.e., about 400° F. Then, upon raising of the temperature higher, i.e., about 500° F. the epoxy will carbonize. There is thus produced a substitute pattern, formed of carbon rather than plastic foam, which is subsequently embedded in a settable investment. Carbon possesses certain advantages, including that of strength over plastic foam.

An additional modification of the cell structure can be obtained by immersing the plastic foam into conventional solvents such as trichlorethylene, prior to investment. This procedure causes a controlled swelling of the plastic foam which changes the cell size and ligament dimensions.

As a side line to the above, the reticulated carbon structure could be heated in an oven or the like in a reducing atmosphere until the carbon turns to graphite. This requires temperatures in the range of about 2500° C. to 3000° C. and a period of several to about 30 days, but upon completion, a foam graphite is produced, which is not believed heretofore capable of being practically made.

I claim:

1. A method for producing an insoluble foam material having a predetermined reticulated structure formed of ligaments, comprising:
   providing as a pattern a self-supporting reticulated polyurethane foam formed of ligaments;
   preparing an investment of said treated foam pattern by filling the voids of said pattern with an aqueous suspension of plaster of paris and allowing said suspension to set;
   subjecting said investment to a temperature of about 250° F. for about 2 hours;
   creating voids in said investment corresponding in configuration to the reticulated structure of said pattern by increasing the temperature of said investment to the range by increasing the temperature of said investment to the range of about 1,000 to 1,500° to volitalize all of said foam;
   introducing molten substance selected from metals, metal alloys, ceramics and cermets, into said investment in an amount sufficient to fill the voids previously occupied by said reticulated structure, said investment being unreactive with said molten substance;
   causing said molten material to solidify by lowering its temperature to below its melting point; and
   thereafter washing away said investment substance.

2. A method as set forth in claim 1 in which a pressure differential is created on different portions of said investment during the introduction of the molten substance therein, with said substance being introduced on the portion of greatest pressure.

3. A method as set forth in claim 2 in which said investment is subjected to a vacuum adjacent a portion thereof remote from the portion wherein the substance is being introduced.

4. A method as set forth in claim 2 in which said investment is subjected to gas pressure adjacent the portion thereof wherein the portion is being introduced.

5. A method as set forth in claim 4 in which said gas is selected from the group consisting of air and inert gases.

6. A method as set forth in claim 1 in which said investment is vibrated as the molten substance is poured therein.

7. A process in accordance with claim 1 wherein a temporary increase in the cross-sectional dimension of the ligaments of said foam is accomplished by coating said ligaments with a thin layer of a wax selected from dental wax, investment wax, or household parafin.

8. A process in accordance with claim 7 wherein the temporary increase in the cross-sectional dimension of the ligaments of said foam is accomplished by swelling said ligaments with a solvent.

9. A process in accordance with claim 8 wherein said solvent is trichorethylene.

10. A process in accordance with claim 1 wherein the insoluble molten material is molten aluminum.